United States Patent
Micevski et al.

(10) Patent No.: US 11,621,547 B1
(45) Date of Patent: Apr. 4, 2023

(54) ELECTRONIC COMPONENT HOLDER FOR CONTROL BOXES

(71) Applicant: TULSAR CANADA LTD, Brantford (CA)

(72) Inventors: George Micevski, Stoney Creek (CA); Jim Streeter, Cambridge (CA); Mike Colalillo, Stoney Creek (CA); Michael Certain, Brantford (CA); Joe Bonnici, Ancaster (CA)

(73) Assignee: Tulsar Canada Ltd, Ontario (CA)

( * ) Notice: Subject to any disclaimer, the term of this patent is extended or adjusted under 35 U.S.C. 154(b) by 482 days.

(21) Appl. No.: 16/750,248

(22) Filed: Jan. 23, 2020

Related U.S. Application Data

(60) Provisional application No. 62/796,157, filed on Jan. 24, 2019.

(51) Int. Cl.
*H02B 1/48* (2006.01)
*H01H 45/04* (2006.01)
*H01G 2/02* (2006.01)

(52) U.S. Cl.
CPC ............. *H02B 1/48* (2013.01); *H01G 2/02* (2013.01); *H01H 45/04* (2013.01)

(58) Field of Classification Search
None
See application file for complete search history.

(56) References Cited

U.S. PATENT DOCUMENTS

| | | | |
|---|---|---|---|
| 4,400,672 A | 8/1983 | Bottelson | |
| 5,016,139 A * | 5/1991 | Stopa | H05K 7/209 361/720 |
| 6,229,236 B1 | 5/2001 | Fisher et al. | |
| 6,300,564 B1 | 10/2001 | Moraes et al. | |
| 6,885,538 B1 * | 4/2005 | Ishii | H05K 3/301 361/308.1 |
| 7,069,649 B2 * | 7/2006 | Tsunezaki | H05K 7/12 361/272 |
| 10,199,804 B2 * | 2/2019 | Ramm | H02B 1/48 |
| 10,356,960 B2 * | 7/2019 | Park | H05K 7/209 |
| 10,715,031 B2 * | 7/2020 | Nishimura | H05K 7/1401 |
| 11,349,234 B2 * | 5/2022 | Devine | H01R 12/7005 |
| 2009/0262503 A1 * | 10/2009 | Kaneko | H05K 7/20854 361/705 |
| 2015/0146380 A1 * | 5/2015 | Lu | H05K 3/328 361/709 |
| 2021/0012972 A1 * | 1/2021 | Murray, Jr. | H01R 12/58 |

OTHER PUBLICATIONS

"Air Conditioner Run Cap Capacitor Holder" Guitartoys—Thingiverse (Jun. 18, 2017) https://www.thingiverse.com/thing:2391910.

* cited by examiner

*Primary Examiner* — Courtney L Smith
(74) *Attorney, Agent, or Firm* — Scott R. Cox; Jessica C. Ronald; Jeffery P. Langer

(57) ABSTRACT

An electronic component holder for a control box for holding non-passive components, such as capacitors, relays and circuit breaker switches to a surface of the control box. The electronic component holder is welded or secured to an inner surface of the control box. By the structure of the electronic component holder, the need for use of conventional fasteners, such as screws or bolts, to hold the electronic components in place within the control box is eliminated.

13 Claims, 9 Drawing Sheets

US 11,621,547 B1

ELECTRONIC COMPONENT HOLDER FOR CONTROL BOXES

CROSS REFERENCE TO RELATED APPLICATION

This application claims priority from provisional application Ser. No. 62/796,157, filed Jan. 24, 2019.

FIELD OF THE INVENTION

The present invention relates to electronic component holders used in control boxes and, more specifically, to the structure of these electronic component holders, which permits safe and secure placement and retention of different types of electrical Components within control boxes.

BACKGROUND

Most electrical appliances are ultimately connected to electrical control boxes, which hold electronic components necessary for the operation of the appliances. Such control boxes typically include control switches, such as on/off switches, function switches, thermostats, etc. They also include mounts for non-passive components, such as relays and capacitors. Such mounts have been disclosed, for instance, in U.S. Pat. Nos. 4,400,672 and 6,300,564. These previously disclosed electronic component holders and mounts require use of fasteners, such as screws, to hold the electronic components in place within the control box. The use of this type of fasteners makes it difficult for a repairman to easily access the electronic components, if replacement is required. Further, these fasteners can be lost, rust, or break and thus, frequently require regular maintenance. What is needed are electronic component holders for non-passive components that hold those components safely and securely and that do not require screws or fasteners to hold the components in place within the control box.

The inventors have discovered unique designs for such electronic component holders that allows easy access to the electronic components without the need to unscrew or unbolt the electronic components from their respective holders.

SUMMARY OF INVENTION

One aspect of the invention is an electronic component holder for a control box including a capacitor cradle surface element, secured to an inner surface of the control box at a base of the cradle surface element, which extends upward from the inner surface of the control box to a top edge of the cradle surface element and has an unique arrow-shaped design.

An additional aspect of the invention is an electronic component holder for a control box including a wall of the control box containing openings passing therethrough to receive a pin of a circuit breaker, and a circuit breaker holder secured to the wall containing an H-shaped body with arms and a cross bar extending between the arms.

A further aspect of the invention is an electronic component holder for a control box including a base portion, secured to an inner surface of the control box, an upwardly extending relay stop spring lever and a relay hook.

An additional aspect of the invention is an electronic component holder for a control box including a T-shaped cradle, secured to an inner surface of the control box containing a stem body, arms at one end of the stem body and a hook at an opposite end of the stem body.

DETAILED DESCRIPTION OF DRAWINGS

Figure 1:
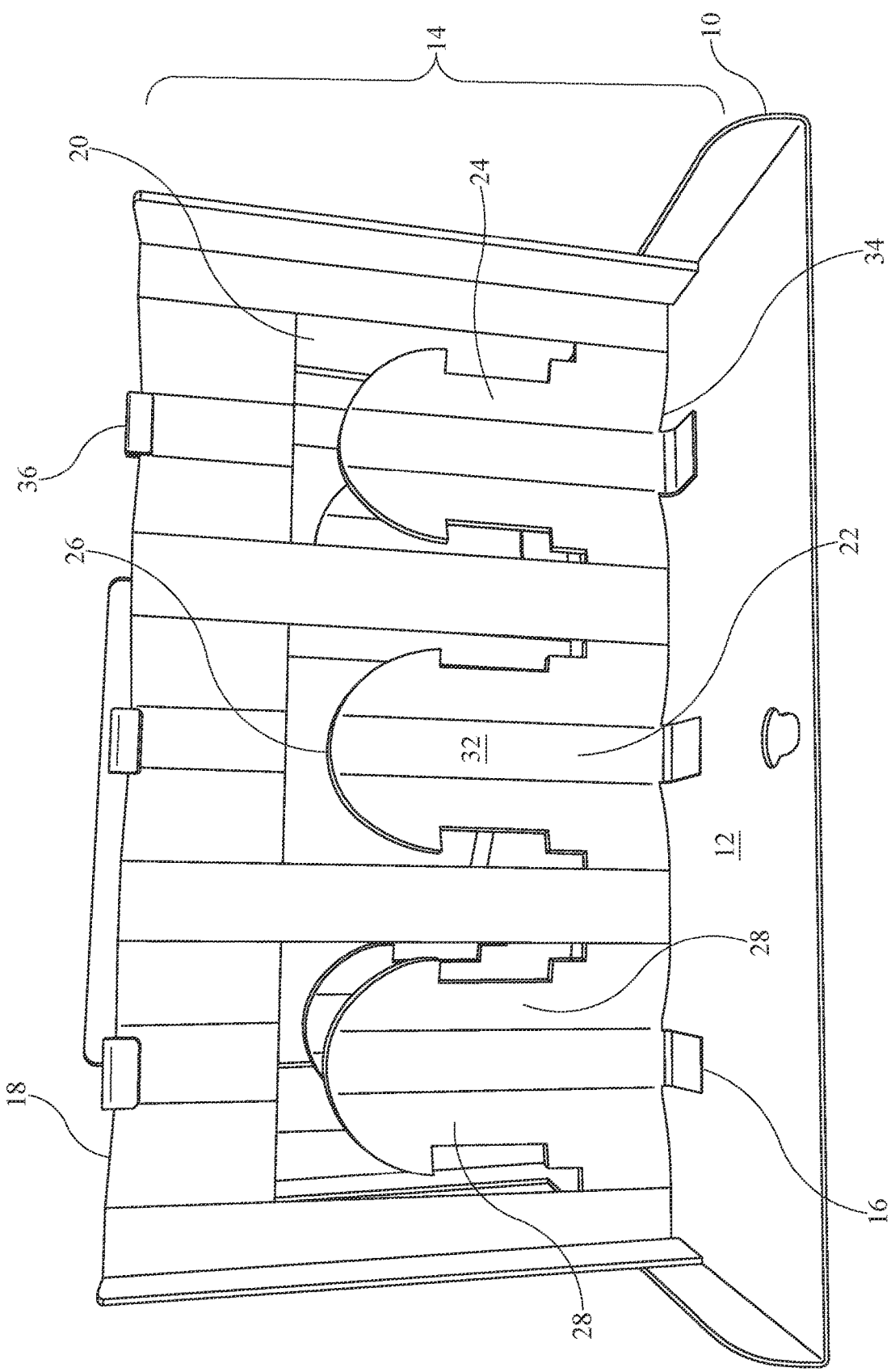
FIG. 1 is a front view of a capacitor cradle surface element for a control box.
Figure 2:
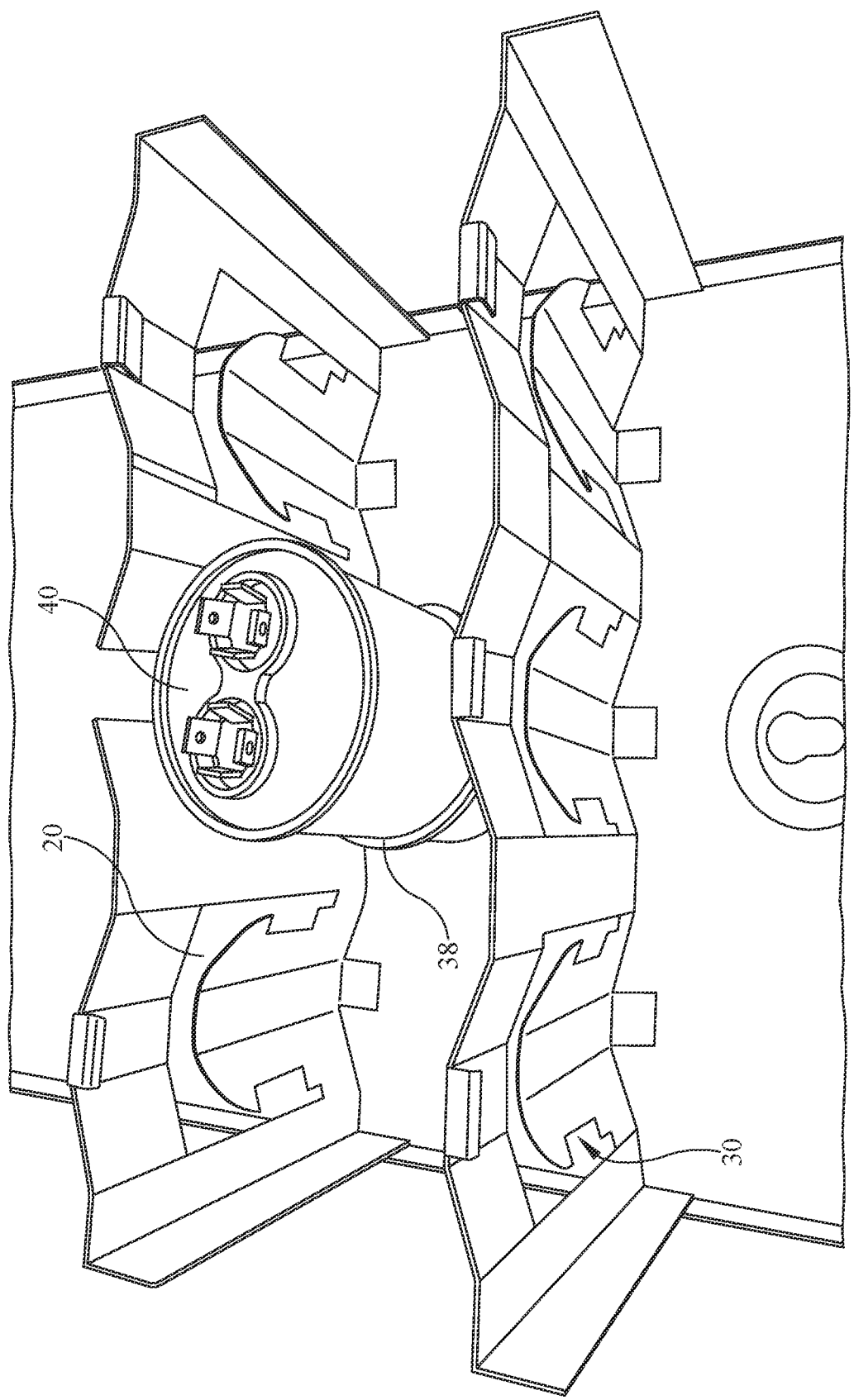
FIG. 2 is a top, perspective view of the capacitor cradle surface element for a control box of FIG. 1.

One embodiment, as shown in FIGS. 1 and 2, is an electronic component holder for a control box (10) including a capacitor cradle surface element (14) that is secured at a base (16) of the capacitor cradle surface element to an inner surface (12) of the control box. The base of the capacitor cradle surface element is secured, preferably by welding, to the inner surface of the control box. The surface element preferably extends upward from the inner surface of the control box to a top edge (18) of the cradle surface element at an angle of about 90°. A top edge of the component holder includes a capacitor hook (36) that extends outwardly and downward from the top edge to aid in holding a capacitor (40) in the surface element (see FIG. 2). The hook aids in preventing the capacitor from sliding off the end of capacitor cradle surface element if the control box is tipped or installed upside down. Advantageously, the hook holds the capacitor within the cradle without use of any fastener, such as a screw. This provides a superior capacitor holding capability and allows easier access to the capacitor when it fails and needs replacing.

In the embodiment shown in FIGS. 1 and 2, the inner surface of the capacitor cradle surface element (14) includes one or more cut out sections (20) and non-cut out sections (22). The non-cut out sections preferably including an arrow-shaped portion (24) that includes a tip (26), sides (28) and a body portion (32). The body portion extends from the tip of the arrow-shaped portion to a base of the body portion (34). The base of the body portion forms a portion of the base of the capacitor cradle surface element (14). In the embodiment shown in FIGS. 1 and 2, the base of the surface element and the base of the body portion of the arrow-shaped portion are preferably one continuous piece of metal, which is secured, preferably by welding, to an inner surface of the control box.

The sides (28) of the arrow-shaped portion include one or more cradle position slot sections (30). These slot sections are important for use in holding the capacitor (40) in the capacitor cradle surface element by use of a holding device (38), such as a zip tie or other such holding devices, which wraps around the capacitor (40) that is resting in the surface element, as shown in FIG. 2. The holding device further wraps around a back side of the surface element passing through the cradle position slot sections in the side of the arrow-shaped portion. Advantageously, the portion of the arrow-shaped portion including the cradle position slot sections are narrower than the base of the arrow-shaped portion so that the holding device cannot shift and slide excessively upwards off of the arrow-shaped portion. Zip ties are advantageously used as the holding device as they require no tool to break and no tool to replace with a new one secured around a capacitor. Further, by use of a zip tie, no small parts are present, which can be lost; a problem that commonly arises with the use of other conventional fasteners. Further, zip ties are not specific in size as they come in a variety of widths, lengths and various versions can be used, unlike screws and bolts that are limited by their thread and pitch size.

The sides of the arrow-shaped portion (28) are preferably angled at about fifteen degrees (15°) to about forty-five degrees (45°) away from the body portion of the arrow-shaped portion (32). This angling of the sides is beneficial as it mimics the outline of the shape of a capacitor to cradle the capacitor and hold the capacitor in a fixed position.

In another embodiment, the electronic component holder for a control box comprises a circuit breaker holder (42), as shown in FIGS. 3-6. This device for securing circuit breaker to the wall of the control box advantageously holds the circuit breaker in place without the need for a fastener.

Figure 4:
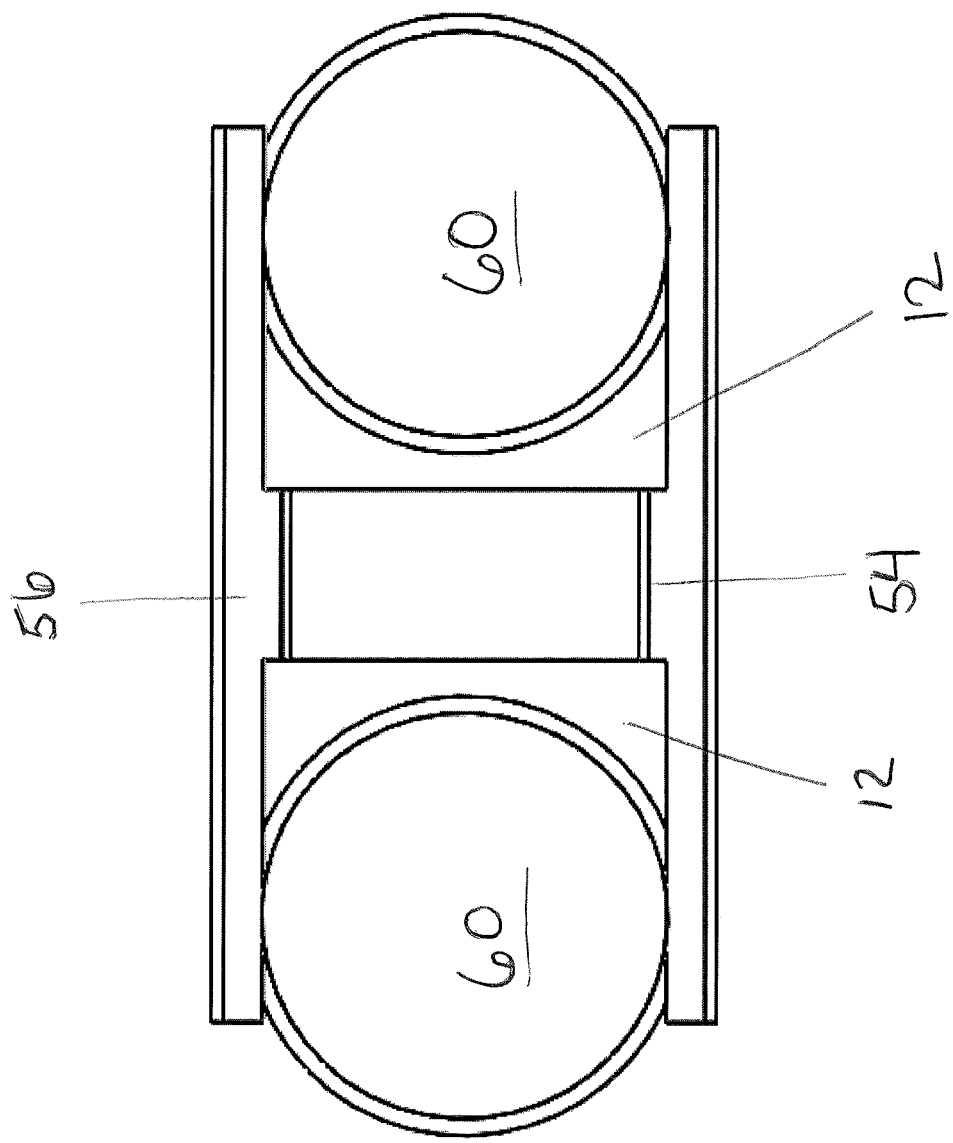
FIG. 4 is a top view of the circuit breaker holder for the control box of FIG. 3 holding two circuit breakers secured within the control box.
Figure 6:
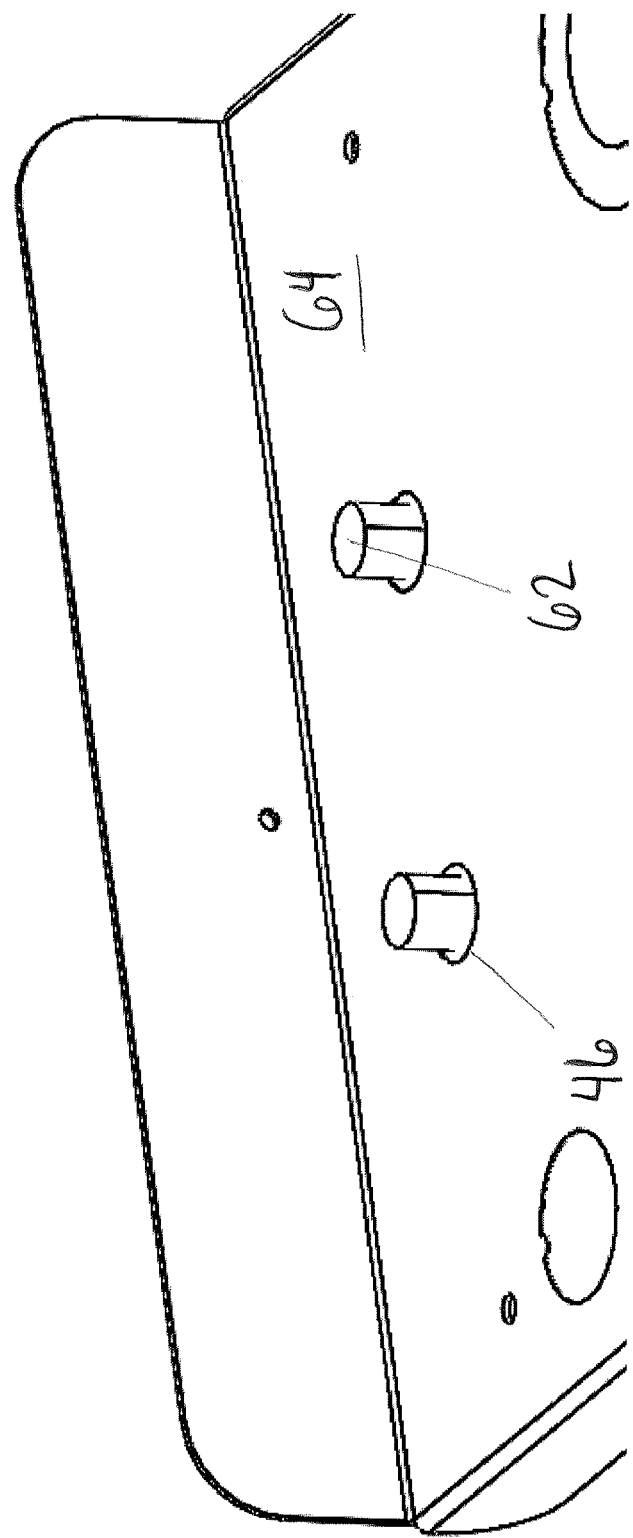
FIG. 6 is a bottom view of a wall of the control box for the circuit breaker holder of FIG. 3 showing pins of two circuit breakers extending through openings in the wall of the control box.

The circuit breaker holder is secured to a wall (44) of the control box, as shown in FIG. 4, which wall has openings (46) for receiving pins (62) of a circuit breaker (60) that is held in position within the control box by the circuit breaker holder. The pins pass through the openings of the wall of the control box to an outer surface of the control box (64), as shown in FIG. 6.

Figure 3:
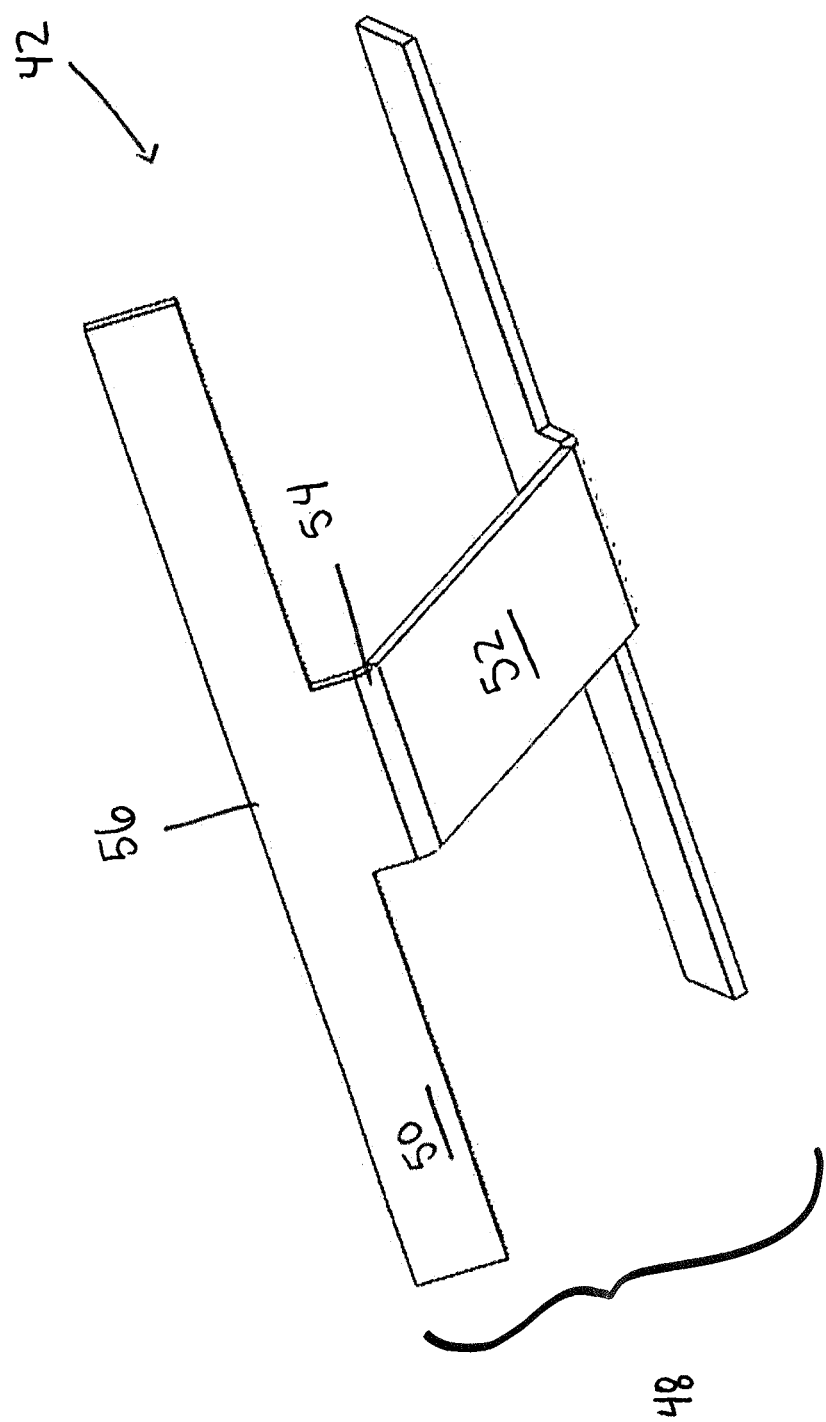
FIG. 3 is a bottom perspective view of a circuit breaker holder for a control box.
Figure 5:
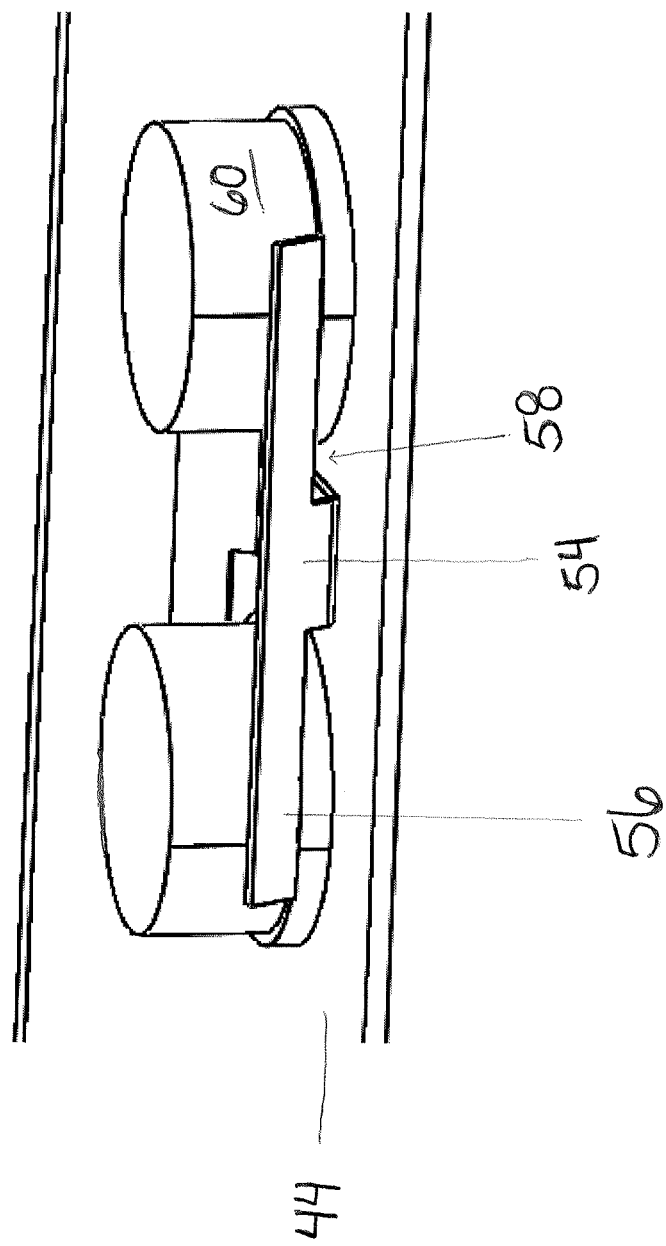
FIG. 5 is a side view of the circuit breaker holder for the control box of FIG. 3 secured to the control box holding two circuit breakers.

In this embodiment, the circuit breaker holder (42) preferably has an H-shaped body (48), as shown in FIG. 3, that includes arms (50) and a cross bar (52) that extends between and joins the arms of the H-shaped body. The cross bar is secured to an inner surface of the wall of the control box (12), as shown in FIG. 4. An outer portion (54) of the crossbar and an outer portion (56) of the arms are preferably bent at an angle of about five degrees (5°) to about seventy-five degrees (75°) away from the inner surface of the wall of the control box. This upward angling ensures that the arms of the H-shaped body do not touch the inner surface of the wall of the control box and also form a slot (58) between the arms of the circuit breaker holder and the inner surface of the wall of the control box. This slot aids in securing the circuit breaker within the circuit breaker holder, as the sides of the circuit breaker holder form a dual edge catch that holds the circuit breaker in place. As shown in FIG. 5, the sides of the circuit breaker slide into the dual edge catch element of the arms. The circuit breaker can only be removed when the dual edges are separated by the pressing of the pin on the opposite side of the wall of the control box, allowing the circuit breaker to move past the dual edge catch.

Figure 7:
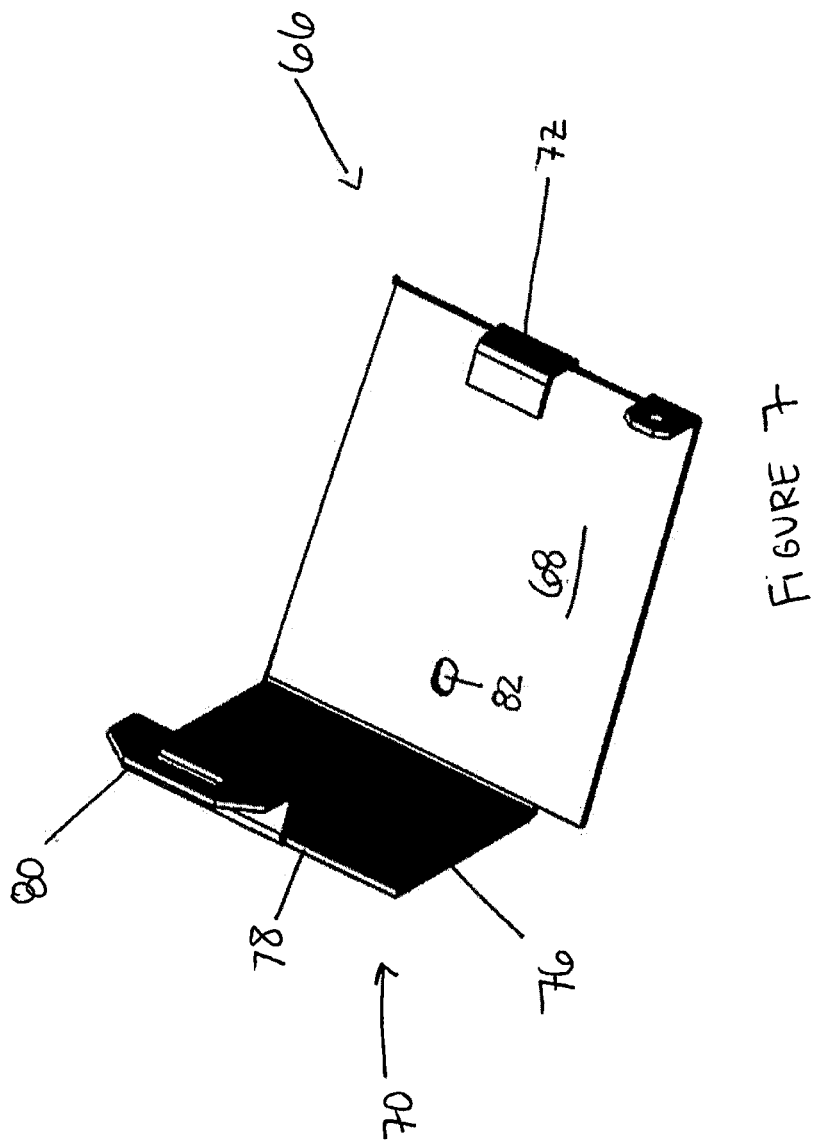
FIG. 7 is a top perspective view of a relay holder for a control box.

In another embodiment of an electronic component holder for a control box, as shown in FIGS. 7, is electronic component relay holder (66). This relay holder includes a base portion (68) that is secured to the inner surface of the control box (not shown). The relay holder also includes a relay stop and spring lever (70) at one end of the base portion and a relay hook (72) at an opposite end of the base portion.

In one embodiment, the relay stop and spring lever extends upward from the base portion of the electronic component holder perpendicularly. The relay stop and spring lever includes an upwardly extending relay stop portion (76) and a lever portion (80). The lever portion is secured to a top edge of the relay stop portion (78). In one embodiment, the lever portion extends inwardly from the top edge of the relay stop portion and then further bends upwardly. This extension of the lever portion both holds the relay in place, and also allows a repair man who applies force to the top edge of the relay holder to remove easily the relay from the relay stop and spring lever without use of a screwdriver, as there are no separate fasteners holding the relay in place.

The relay hook (72) is located across from the relay stop and spring lever (70), as shown in FIG. 7, and includes an upper portion which bends upward from the base portion at an angle of about forty-five degrees (45°) to about one hundred and twenty degrees (120°), and then further bends inward toward the relay stop at an angle of about forty five degrees (45°) to about one hundred and twenty degrees (120°), preferably about ninety degrees (90°). This component holds the relay in place within the control box without the use of fasteners, because the hook engages an edge of the relay. Accordingly, the only force that is needed to remove the relay is applied force. Further, in another embodiment, the hook may have a slot for a screwdriver to aid in adding leverage for removal of the relay.

Figure 8:
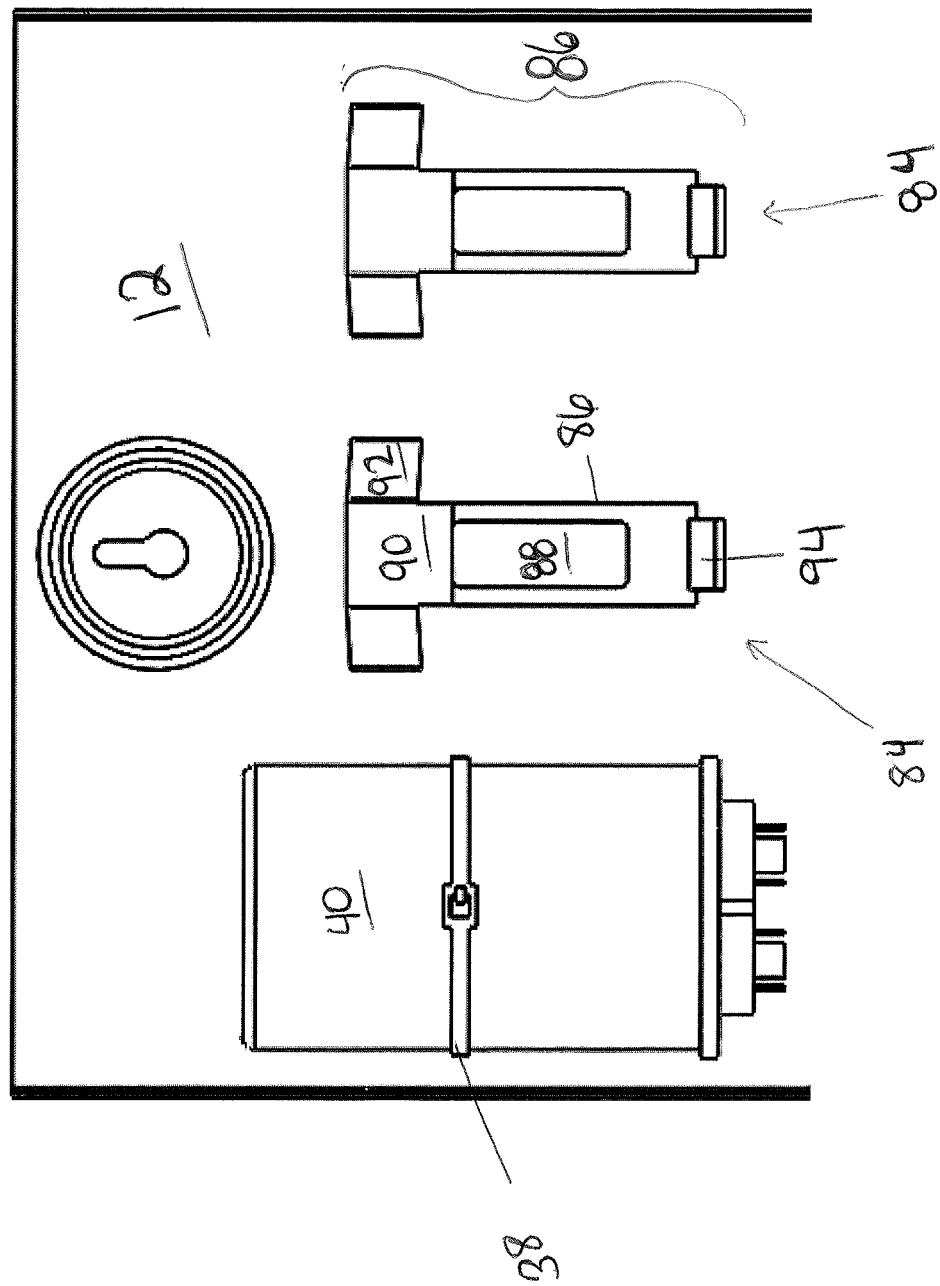
FIG. 8 is a top view of three capacitor holders secured within a control box with one holding a capacitor.
Figure 9:
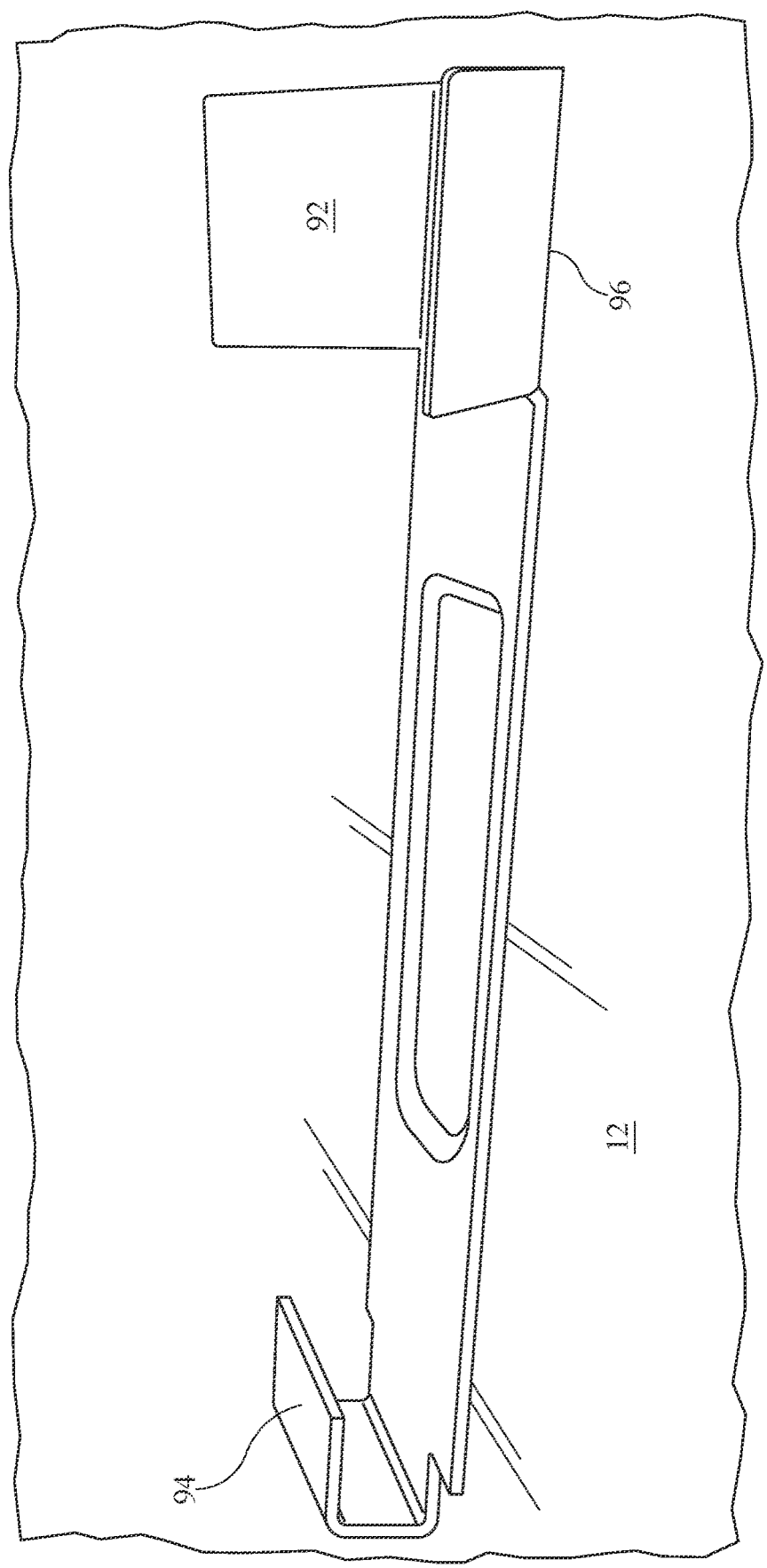
FIG. 9 is a side view of the capacitor holder secured to the control box of FIG. 8 for holding a capacitor.

In another embodiment the electronic component holder for a control box includes a capacitor holder (84), as shown in FIGS. 8 and 9. The capacitor holder includes a T-shaped cradle (86). The T-shaped cradle is secured to an inner surface of the control box (12) and has a stem body (88), arms (92) located at one end of the stem body, and a hook (94), which is located at an opposite end of the stem body. While the stem body is secured to the inner surface of the control box by conventional securing methods, such as welding, a portion of the stem body (90) that is located adjacent to the arms is not secured to the inner surface of the control box but rather is bent upward away from the surface of the control box to form a slot (96) between the inner surface of the control box and the stem body, as shown in FIG. 9. Advantageously, this slot allows the passage of a holding device (38), such as a zip tie, around the front surface of a capacitor and around the back portion of the stem body that is not secured to the inner surface of the control box, thereby holding the capacitor in place without use of any other fasteners, as shown in FIG. 8.

The arms of the T-shaped body are bent upward away from the surface of the control box at an angle of about twenty-five degrees (25°) to about seventy-five degrees (75°). This upward bend acts as a support that assists in holding the capacitor in place. The hook (94) acts as a stop for the capacitor when the capacitor is placed on top of the hook, as shown in FIG. 8.

While several embodiments of the present invention have been shown and described, it is understood that many changes and modifications can be made thereto without departing from the scope of the inventions as disclosed herein.

LISTING OF ELEMENTS

Control box—10
Inner surface of control box—12
Capacitor cradle surface element—14
Base of the surface element—16
Top edge of the surface element—18

Cut out sections—20
Non-cut out sections—22
Arrow shaped portion—24
Tip of the arrow shaped portion—26
Sides of the arrow shaped portion—28
Cradle position slots of the sides—30
Body portion of the arrow shaped portion—32
Base of the body portion—34
Capacitor hook—36
Flexible holding device—38
Capacitor—40
Circuit breaker holder—42
Wall of the control box—44
Openings—46
H-shaped body—48
Arms—50
Cross bar—52
Outer portion of crossbar—54
Outer portion of arms—56
Slot—58
Circuit breaker—60
Pin—62
Outer surface of control box—64
Relay holder—66
Base portion of the electronic component holder—68
Relay stop/spring lever—70
Relay hook—72
Upwardly extending relay stop portion—76
Top edge of relay stop portion—78
Lever portion—80
Relay index slot—82
capacitor holder—84
T-shaped cradle—86
Stem body—88
Portion of the stem body—90
Arms—92
Hook—94
Slot—96

What is claimed is:

1. An electronic component holder for holding a removable capacitor for a control box comprising:
a capacitor cradle surface element secured to an inner surface of the control box at a base of the cradle surface element, wherein the element extends upward from the inner surface of the control box; wherein the cradle surface element comprises one or more cut out sections, non-cut out sections and a top edge, wherein the non-cut out sections form a shaped structure, wherein the shaped structure comprises a tip, sides, and a body portion, wherein each side of the shaped structure comprises one or more cradle position slot sections; wherein the top edge of the cradle surface element includes a hook element extending outward from the top edge to hold the capacitor to the cradle surface element.

2. The electronic component holder of claim 1 wherein the shaped structure comprises an arrow-shaped portion and wherein the tip thereof extends away from the cradle surface.

3. The electronic component holder of claim 1 wherein the sides are angled at about fifteen degrees (15°) to about forty-five degrees (45°) away from the body portion.

4. The electronic component holder of claim 1 further comprising a holding device, which wraps around the removable capacitor to hold it in place against the capacitor cradle surface element.

5. The electronic component holder of claim 1 wherein the base of the capacitor cradle surface element is one continuous piece of metal.

6. The electronic component holder of claim 5 wherein the base of the body portion is secured to the inner surface of the control box.

7. The electronic component holder of claim 1 wherein a portion of the shaped structure including the cradle position slot sections is narrower than the base of the shaped structure of the holder.

8. An electronic component holder for a control box comprising a capacitor holder comprising:
a T-shaped cradle, secured to an inner surface of the control box, comprising a stem body, arms at one end of the stem body and a hook secured to an opposite end of the stem body, wherein a portion of the stem body is securable to an inner surface of the control box, and
wherein the hook extends outward from the stem body to hold a capacitor to the stem body.

9. The electronic component holder of claim 8 wherein the arms of the T-shaped body are bent upward from the inner surface of the control box at an angle from about twenty-five (25°) degrees to about seventy-five degrees (75°).

10. The electronic component holder of claim 8, further comprising a holding device for securing a capacitor through a slot between the inner surface of the control box and the stem body.

11. An electronic component holder for a control box comprising a capacitor holder comprising:
a T-shaped cradle, secured to an inner surface of the control box, comprising a stem body, arms at one end of the stem body and a hook secured to an opposite end of the stem body, wherein a portion of the stem body is securable to the inner surface of the control box, and
wherein the portion of the stem body adjacent to the arms is not secured to the control box and is bent upward away from the inner surface of the control box.

12. The electronic component holder of claim 11 wherein the arms of the T-shaped body are bent upward from the inner surface of the control box at an angle from about twenty-five (25°) degrees to about seventy-five degrees (75°).

13. The electronic component holder of claim 11, further comprising a holding device for securing a capacitor through a slot between the inner surface of the control box and the stem body.

* * * * *